Figure 1:
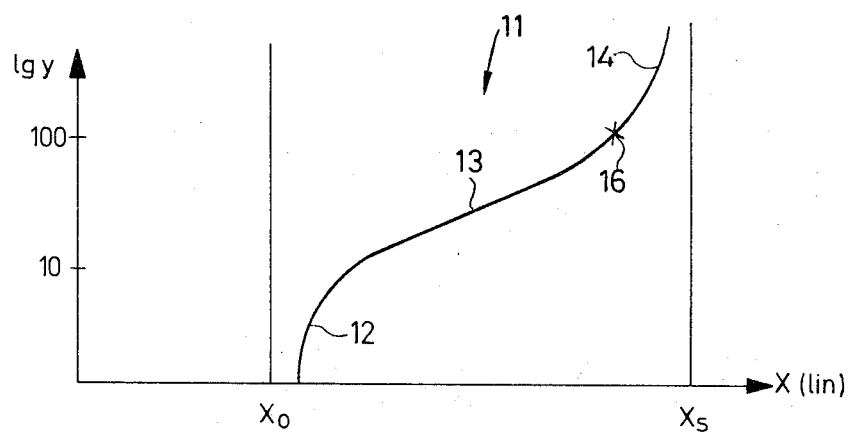

United States Patent [19]
Ott

[11] 3,854,042
[45] Dec. 10, 1974

[54] DEVICE FOR MEASURING THE THICKNESS OF LAYERS WITH A RADIONUCLIDE IRRADIATING THE LAYER

[76] Inventor: Albert Ott, Am Weinberg 22, 6201 Auringen b/Wiesbaden, Germany

[22] Filed: May 10, 1973

[21] Appl. No.: 359,010

[52] U.S. Cl.................. 250/308, 250/272, 250/358
[51] Int. Cl. ........................................... G01n 23/00
[58] Field of Search..................... 250/308, 272, 358

[56] References Cited
UNITED STATES PATENTS

| | | | |
|---|---|---|---|
| 3,412,249 | 11/1968 | Hanken | 250/308 |
| 3,499,152 | 3/1970 | Hetenhouser | 250/308 |
| 3,639,763 | 2/1972 | Streng | 250/308 |

Primary Examiner—Archie R. Borchelt

[57] ABSTRACT

A device for measuring the thickness of layers by measuring the count rate of backscattered radiation. Between a detector and an indicator is a digital computer which operates according to an equation for a dimensionless normalized impact number, which includes constants which relate to the emitter used and the combination of layer material and carrier material.

1 Claim, 6 Drawing Figures

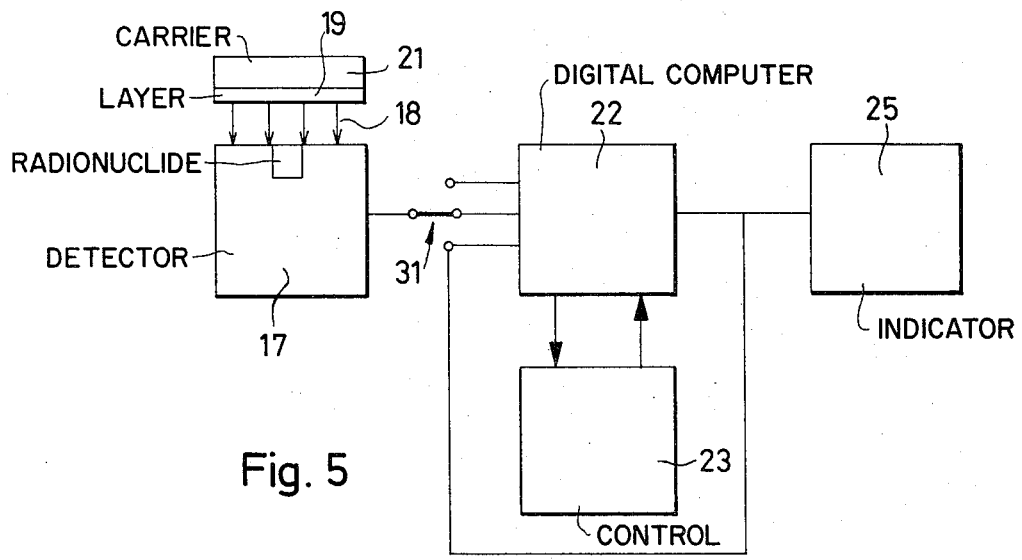

DEVICE FOR MEASURING THE THICKNESS OF LAYERS WITH A RADIONUCLIDE IRRADIATING THE LAYER

This invention deals with a device for measuring the thickness of layers, with a radionuclide irradiating the layer, which radionuclide produces energy proportional to the thickness of the layer, with a detector which receives the backscatter radiation backscattered from the layer and a possibly present carrier material and produces at its output end a pulse rate in the region between a lower first count, corresponding to the backscatter belonging to layer thickness zero, and an upper count belonging to the region of a quasi-infinitely thick layer, with circuitry allowing for the nonlinear relationship between count rate and layer thickness and subsequently added indicator.

Through German Federal Patent 1 959 008 a device of this type has become known. The count of the detector depends, among other things on the order number of the layer to be measured, on the order number of the carrier material, the nature of the emitter, the geometry of the slit in the measuring table, the measuring dimensions, etc. Of all these numerous parameters, we are only interested in the relationship between the detector count and the layer thickness, independent of the other parameters. The above-mentioned patent is based on the knowledge that the calibration curves are part of a family of curves obeying a common law, regardless of the various changing parameters. With a linearizing network an attempt was made to reduce the nonlinear relationship between layer thickness and count to a linear relationship of constant scale, eliminating the parameters which are of no concern.

This has been successful for a wide measuring range also, from the region of very thin layers up to barely above the region where, plotted on semilog paper, the function layer thickness vs. count rate leaves the linear part of the plot. Nevertheless, the branch of the curve which asymptotically approaches the value corresponding to layer thickness "infinity" could not yet be linearized with satisfactory accuracy when using only the antidistortion function named in the above invention. In addition, the region from very thin layer thicknesses down to layer thickness zero has not yet been linearized with sufficient accuracy by using the antidistortion function given in that patent.

Furthermore, the drift of the measured values offers difficulties. With this type of measuring technique this is undesirable since here one deals only with statistical measurement results anyhow. Therefore a measured value deviation is difficult to analyze and one frequently doubts whether the measured value deviation is a deviation from the statistical mean or a deviation on account of drift.

In this invention one also works directly with the detector count. This means that the count, e.g. for the value of the layer thickness "infinity," depending on the order number of the layer can vary within a range of several powers of ten. This also applies to counts on the uncoated carrier material or comparable layer thicknesses of different material. Hence, the known device must be able to process counts in a very wide range.

It is the purpose of this invention to provide a device of the type named at the outset, which device in the region for small and medium-sized layers establishes a relationship between count and layer thickness with sufficient accuracy, but, in addition, establishes the desired relationship between count and layer thickness for layers which are very thick up to infinitely thick and which are very thin down to layer thickness zero. At the same time, the new device must be simple to operate, must make possible quick adjustment of the measuring instrument and must operate free from temporary drift phenomena.

According to this invention, this problem is solved by providing a digital computer which operates according to the equation $$X_n = 1 - \frac{1 + \frac{aX_s}{X_s - X_o}}{\exp(Y/c) + \frac{aX_s}{X_s - X_o}}$$

where $X_o$ = count belonging to layer thickness zero
$X_s$ = count belonging to layer thickness infinity
$X$ = count belonging to the layer to be measured
$X_n = X - X_o/x_s - X_0$
$e$ = 2.71 (base of natural logarithms)
$a$ = dimensionless constant belonging to a certain emitter and a certain combination of layer material/carrier material,
$c$ = a length-affected constant belonging to the same emitter and the same layer material/carrier material combination and
$y$ = thickness of layer to be measured.

Further advantages and characteristics of this invention are evident from the following description of a preferred form of construction. The drawings show the following:

FIG. 1 a plot of the function count vs. layer thickness

Figure 2:
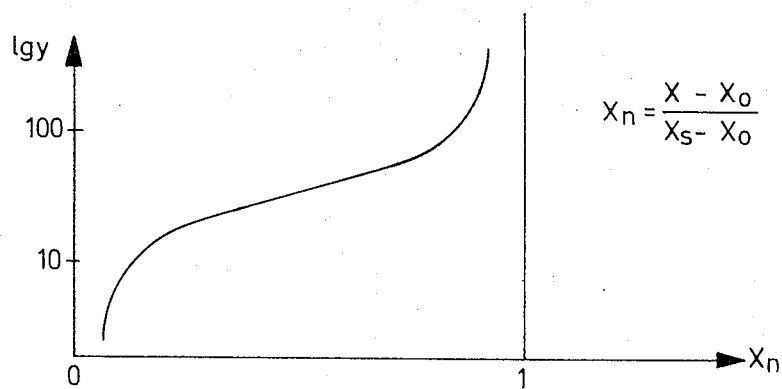

FIG. 2 a normalized plot of the function of FIG. 1

Figure 3:
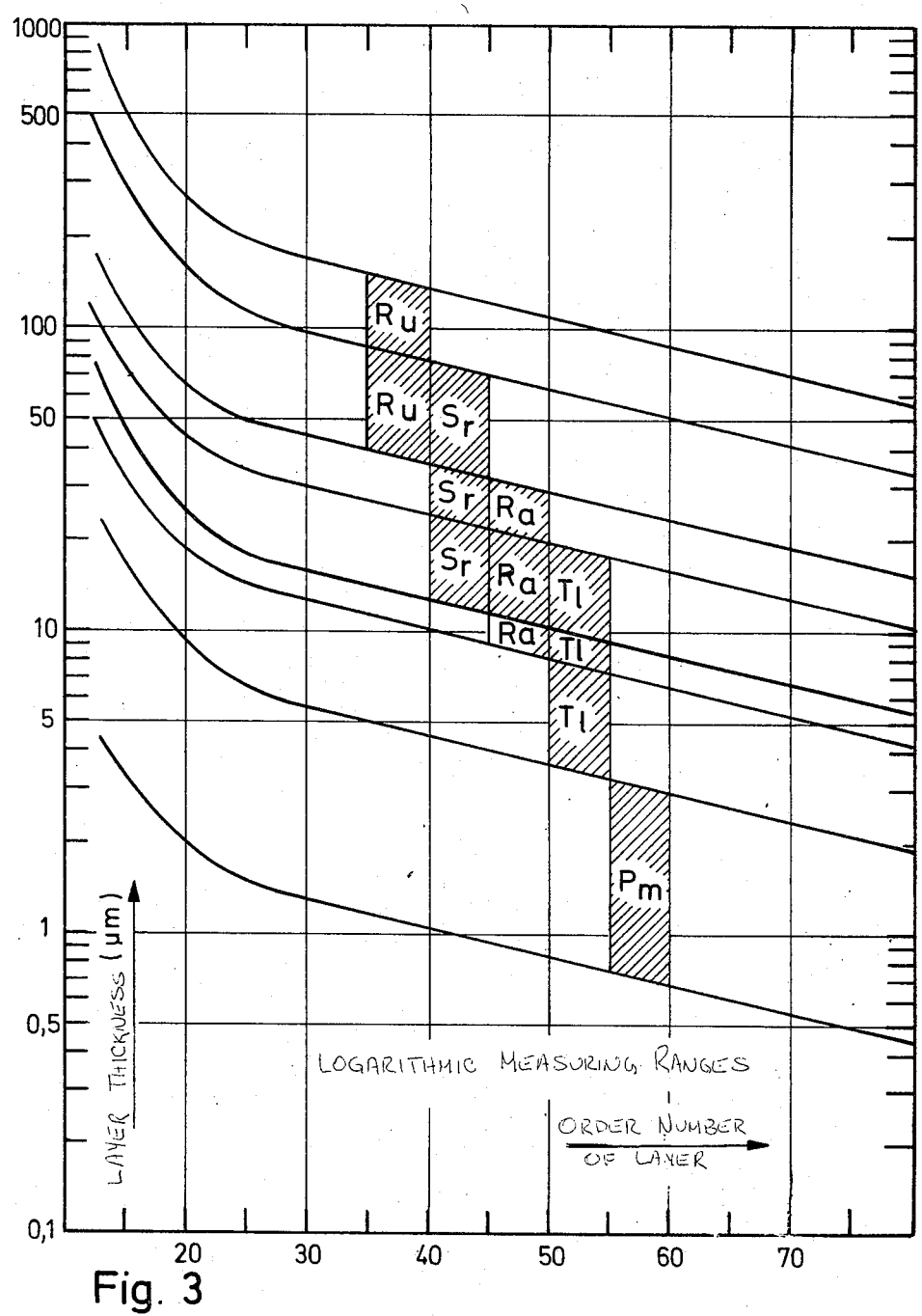
Figure 6:
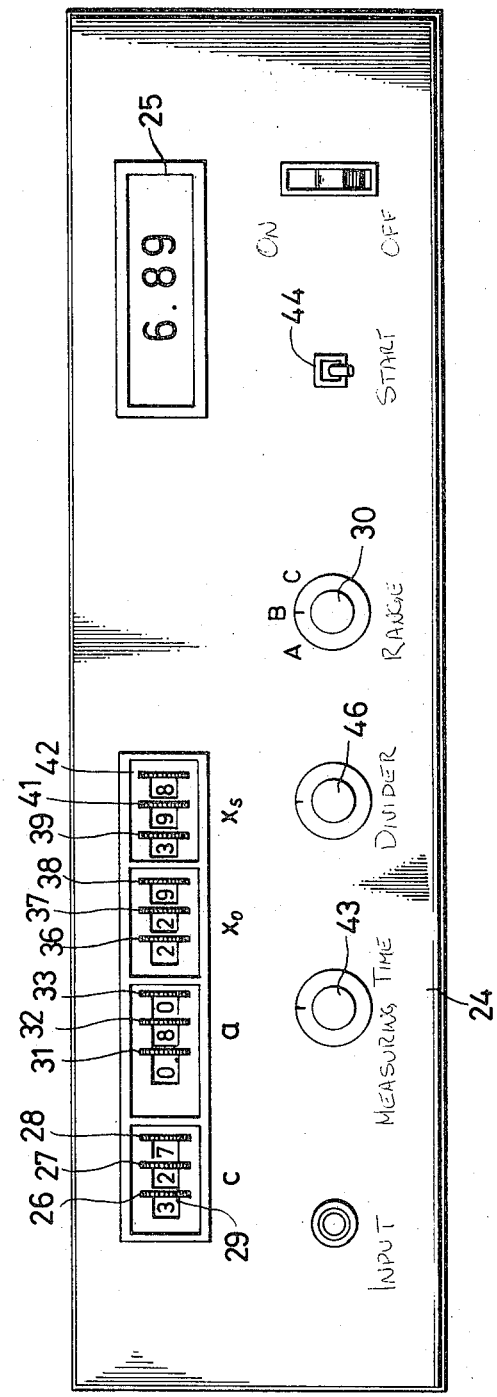

FIG. 3 a curve sheet showing the layer thickness regions as functions of the order number of the layer which regions can be measured by the radionuclides entered as region parameters, FIG. 4 Tabulation of a curve sheetshowing the constants of the above equation, FIG. 5 a block schematic of the essential parts of the device according to the invention, FIG. 6 a view of the front panel of the device acc. to the invention.

FIG. 1 shows a curve 11 with its section 12 curved acc. to an e-function, a linear section 13 and a strongly curved section 14. Concerning accuracy, the known device operates properly up to that section marked by a cross 16. In FIG. 1, $X_o$ is the count belonging to layer thickness zero and $X_s$ is the count belonging to layer thickness infinity.

As a first step, this function is normalized as shown in FIG. 2 according to the equation $X_n = X - X_o/x_s - X_0$.

Then one arrived at the curve shown in FIG. 2. Now the counts are in a synoptical section, from zero to one which does not pose such high circuitry requirements. $X_n$ (normalized impact number) is dimensionless. That the equation is usable is evident from the following transitions;

As count $X$ belonging to the layer to be measured approaches $X_o$, $X$ approaches zero.

As count $X$ approaches $X_s$, the normalized count $X_n$ approaches unity.

With the device according to the invention, a detector 17 receives backscattered Beta rays 18 from a metal layer 19 and a carrier material 21. The associated emitter is not shown and is of a known type. The output of detector 17 is connected to a digital computer which can operate according to formula.

Such computers can be built by the average specialist as a special computer with control 23 providing the desired program sequence. Naturally one can also use a universal computer and program it accordingly. In the long run, however, working with a universal computer will be more expensive than working with a special computer. The equation given above involves a computer incl. control which can be built without additional inventive effort.

The above equation yields the normalized count. However, it can also be transformed easily without inventive effort into an equation where layer thickness Y is the unknown. After receiving the necessary data, computer 22 can compute either layer thickness Y or the normalized count.

Indicator 25 is connected in series with computer 22. Indication is digital, for example with nixie tubes.

With the device according to the invention, one works as follows: First one takes a sheet acc. to FIG. 3 which is known. One knows the order number of the layer and one also knows approximately the order of magnitude of the layer to be measured. From FIG. 3 one recognizes several families of curves. As parameters, various radionuclides are recorded, e.g., promethium, thallium, etc. The radionuclide regions partially overlap, e.g. in the case of thallium and radium. Thinner layers require softer emitters and thicker layers harder emitters. In out form of construction, let it be assumed that the order number of the layer is around 50 (Sn) and that a layer thickness between 5 and 10 mu is expected. One then chooses thallium for a radionuclide. Once a radionuclide has been picked, one takes a sheet acc. to FIG. 4. On the top it shows that this sheet is for thallium. Close to the upper left-hand corner one finds letters S and T which stand for "Layer" and "Carrier." Layer material is tin, gold, chromium, etc. with nickel, iron, silver, etc. as carrier material. Let it be assumed that in the example at hand, a tin layer to be measured is situated on nickel. From the sheet acc. to FIG. 4 one finds that with such a measurement $c = 3.27$ and that $a = 0.8$. Now one adjusts value c on front panel 24 in accordance with FIG. 6. The three knurled wheels 26, 27, 28 belong to impulse transmitters located on a common shaft. Knurled wheel 26 is turned till the value 3 appears in the window. The bottom of the window at 29 also shows the decimal point.

Then value 0.80 is set by means of knurled wheels 31, 32, 33. This provides computer 22 with the necessary data.

If one does not have a sheet acc. to FIG. 4, values for c and a can be obtained easily by an operator of the device: Counts $X_s$ and $X_o$ can be easily determined by placing once carrier material and once "infinitely" thick layer material into the device. Now normalized count $X_n$ can be computed without further ado. Placing two calibration standards of infinite thickness into the device and measuring, one obtains two equations in two unknowns, namely c and a, and hence one can calculate c and a.

After quantities c and a have been put into the computer, the carrier material is applied. Range knob 31 is set to its A position. This corresponds in FIG. 5 to the bottom position of the switch drawn there. Indicator 25 now shows quantity $X_o$. This value is also set by knurled wheels 36, 37, 38, i.e., fed to the computer. In the case at hand, this figure is 229.

By means of knurled wheels 39, 41, 42, value $X_s$ for the count associated with infinite layer thickness is entered, after suitable material has been applied. The count has been read at indicator 25 for the A position of the range knob 31.

Now the thickness of an unknown tin layer on nickel is measured. This layer is applied and the range knob set to its B position. In this position, computer 22 is turned on and, using c, a, $X_o$ and $X_s$ computes the layer thickness to be 6.89 mu and indicates this on indicator 25.

In some cases it is of interest to know normalized count $X_n$. For this purpose, range knob is set to its C position and the computer computes the normalized count in accordance with the given equation.

Like with the device according to German Federal Patent 1 959 008, the measuring time can be selected with a measuring time knob 43. A longer measuring time reduces the statistical error. As with the device acc. to German Federal Patent 1 959 008, the count is subdivided automatically with the measuring time knob 43. With other words, one can connect detector 17 with the first input of an AND stage whose output is connected with a binary reduction device. One can further provide a measuring time transmitter whose output is connected to the second input of the AND stage. Then the binary reduction device is switchable (commutable) together with the measuring time transmitter. Independent of the measuring time, the computer 22 is essentially fed an equal number of pulses, regardless of whether the test duration is the same, double, quadruple etc. of the shortest possible measuring time.

All measuring processes are initiated by start switch 44 which turns on the measuring time transmitter.

When measuring count $X_o$ and $X_s$, there may result within the measuring interval counts which may have six digits. As has been shown, with values $X_o$ and $X_s$ only three digits are significant. Because of everpresent statistical errors it would not make sense to put in $X_o$ or $X_s$ with 4 or 5 digits. In order to keep the digits of no interest out of indicator 25, a divider which can be actuated by divider knob 46 is provided. The associated divider may lie anywhere on the direct connection between detector 17 and indicator 25. It has different division ranges such as, e.g., 1 : 1, 1 : 5, 1 : 10, 1 : 100, etc. This divider should not be confused with the one which was mentioned above and divides the count inversely proportional to the measuring time.

In the exemplified embodiment, computer 22, in accordance with the above, can compute by two functions, vid.: directly by the function put forth in the formula determining the normalized count, or by the equation derived from the above-mentioned equation, with the layer thickness as the unknown. The elements for computing either of these values are essentially the same. It may be pointed out, superfluously, that one obtains a function of a natural logarithm if one solves for the layer thickness.

When measuring with the device according to this invention, several additional advantages ensue: The conversion of the counts into the digital layer indications can be made with one and the same setting of the device, from very thin layers, including layer zero, through medium-sized layers up to very large layer thicknesses. The device according to this invention will yield a greater accuracy. The device according to this invention is free of temporary drift phenomena which any analog-linearizing device would be affected with. Furthermore, the device according to this invention requires a much briefer adjustment time for the measuring instrument, amounting to one-fourth of the time hitherto required.

What is claimed is:

1. Device for measuring the thickness of layers comprising radionuclide means irradiating the layer, which radionuclide means produces energy proportional to the thickness of the layer, detector means which receives the backscatter radiation backscattered from the layer and a possibly present carrier material and produces at its output end a pulse rate, $X$, in the region between a lower first count, corresponding to the backscatter belonging to layer thickness zero, $X_o$, and an upper count belonging to the region of a quasi-infinitely thick layer, $X_s$, series connected indicator means, and controllable digital computing means between the detector means and the indicator means for allowing for the non-linear relationship between count rate and layer thickness, said digital computing means comprising:

means for inputing a dimensionless constant, $a$, associated with the radionuclide being used and the particular combination of layer and carrier materials being measured, means for inputing a length-effected, one dimensional, constant, $c$, associated with the radionuclide being used and the particular combination of layer and carrier materials being measured.

means for normalizing the output count from said detector means comprising means for dividing the difference between said detected count and said lower first count corresponding to layer thickness zero by the difference between said upper count corresponding to a quasi-infinitely thick layer and said lower first count, and means for linearizing said normalized count, $X_n$, in accordance with the following function, in which $Y$ is the thickness of the layer to be measured:

$$X_n = 1 - \frac{1 + \frac{aX_s}{X_s - X_o}}{\exp(Y/c) + \frac{aX_s}{X_s - X_o}}$$

* * * * *